(12) United States Patent
Suzuki

(10) Patent No.: US 7,664,367 B2
(45) Date of Patent: Feb. 16, 2010

(54) INFORMATION PROCESSING DEVICE

(75) Inventor: Tatsuya Suzuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 11/047,733

(22) Filed: Feb. 2, 2005

(65) Prior Publication Data

US 2005/0226594 A1 Oct. 13, 2005

(30) Foreign Application Priority Data

Feb. 3, 2004 (JP) .......................... P2004-026412

(51) Int. Cl.
| | |
|---|---|
| H04N 5/91 | (2006.01) |
| H04N 7/00 | (2006.01) |
| G11B 15/52 | (2006.01) |
| G11B 19/02 | (2006.01) |
| G11B 5/09 | (2006.01) |
| G11B 20/10 | (2006.01) |
| G11B 20/20 | (2006.01) |
| G11B 27/10 | (2006.01) |

(52) U.S. Cl. .................. 386/46; 369/47.32; 369/47.33; 369/47.34

(58) Field of Classification Search ................ 386/109, 386/110, 111, 112, 46, 95, 52, 105; 369/47.32, 369/47.33, 47.34, 47.11, 53.1, 53.34
See application file for complete search history.

(56) References Cited

U.S. PATENT DOCUMENTS

| 4,985,784 | A | * | 1/1991 | Tsuboi et al. ................ 386/109 |
| 6,718,121 | B1 | * | 4/2004 | Shikunami ................... 386/109 |
| 2002/0060961 | A1 | * | 5/2002 | Yamamoto ............... 369/47.11 |

(Continued)

FOREIGN PATENT DOCUMENTS

JP 06-351006 A 12/1994

(Continued)

OTHER PUBLICATIONS

Japanese Office Action issued in Japanese Patent Application No. JP 2005-023042, dated Jan. 6, 2009.

*Primary Examiner*—Marsha D Banks Harold
*Assistant Examiner*—Marc Dazenski
(74) *Attorney, Agent, or Firm*—McDermott Will & Emery LLP

(57) ABSTRACT

A coder codes an information signal. A rate controller controls a coding rate of the coder in accordance with complexity of the information signal. The rate controller controls a coding amount per unit time in the coding process so that an average value of the coding amount can be approximate to an average rate. The coded data is temporarily memorized in a temporary memory unit and processed by an information processing unit such as a recorder and a transmitter. The information processing unit measures an information processing rate in processing the information. The rate controller adjusts the average rate so that the average rate is lower than the information processing rate measured by the information processing unit, or the rate controller compares a threshold value of a used amount of the temporary memory unit which is previously set and an actually used amount of the temporary memory unit and reduces the average rate when the used amount exceeds the threshold value. Thereby, the rate control can be properly executed while the coding amount in accordance with the complexity of the information signal is allocated.

15 Claims, 11 Drawing Sheets

U.S. PATENT DOCUMENTS

2003/0174609 A1 * 9/2003 Choi ....................... 369/47.33

FOREIGN PATENT DOCUMENTS

| JP | 08-046907 A | 2/1996 |
| JP | 08-279976 A | 10/1996 |
| JP | 10-336583 A | 12/1998 |
| JP | 10-336586 A | 12/1998 |
| JP | 11-027617 A | 1/1999 |
| JP | 11-205791 | 7/1999 |
| JP | 2002-191022 | 7/2002 |

* cited by examiner

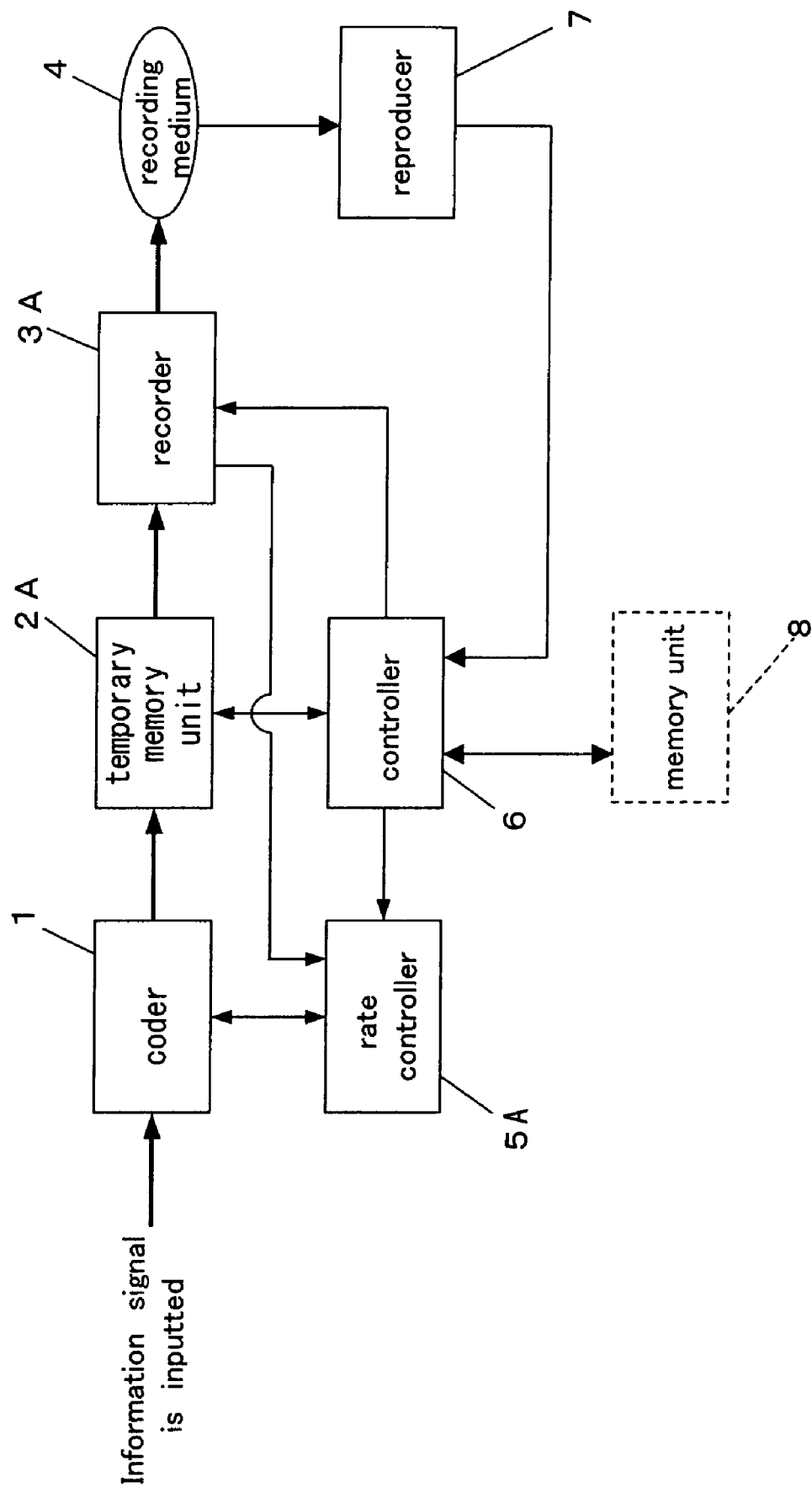

INFORMATION PROCESSING DEVICE

FIELD OF THE INVENTION

The present invention relates to an information processing device, examples of which are an information recording device for coding an information signal such as image and audio and recording the information signal on a recording medium and an information transmitting device for coding the information signal and transmitting it via a transmission line.

BACKGROUND OF THE INVENTION

Conventionally, a magnetic tape has been mainly used as a recording medium on which a coded information signal such as image and audio is recorded. In recent years, however, recording media of different types, such as an optical disk, a hard disk and a semiconductor memory, are increasingly often used as the recording medium. In the magnetic tape, a recordable data volume per unit time is fixed due to its structural restrictions, in response to which the image and audio are also to be coded based on a fixed rate. In contrast, in any of the optical disk, hard disk and semiconductor memory, a recordable data volume per unit time is optionally determined as far as the recording is carried out to any of the media at a maximum recording speed thereof or below. Therefore, when the image and audio to be recorded on any of the media are coded, a relevant coding amount can be changed depending on the complexity of the image and audio. In other words, a generally called variable rate is available in such a medium.

When the variable rate is employed as the coding amount in the coding process, the coding amount to be allocated to the information signal of a high complexity can be increased, while the coding amount to be allocated to the information signal of a less complexity can be reduced. In the foregoing manner, when the variable rate is compared to the fixed rate based on the same total coding amount, an overall quality in using the variable rate can be improved.

As another trend, an increasing number of information transmitting devices for coding the information signal such as image and data and transmitting the information signal to a different device via a transmission line such as LAN are available in recent years. When a recording medium having a large capacity is used as a memory for temporarily memorizing transmission data, the transmission can be carried out based on the variable rate to a certain extent though the transmission line has a limited number of transmission bands.

As an example of a variable rate control implemented in the information recording device for coding and recording the information signal such as image and audio, a method is disclosed in No. 3375851 of the Japanese Patent Applications. In the method recited in the document, recording data is temporarily recorded in a temporary memory device and thereafter actually recorded. More specifically, the data stored in the temporary memory device is immediately written in the recording medium during the time when the coding rate continuously stays below a maximum value of a rate at which the data of the memory device can be recorded on the recording medium (hereinafter, referred to a maximum recoding rate) by a recorder. On the contrary, as soon as the coding rate starts to exceed the maximum recording rate, the data which has not been recorded yet is stored in the temporary memory device as recording-standby data, and then written in the recording medium. In the process, an available capacity of the temporary memory device is monitored so that the coding amount is controlled in such manner that the coding amount exceeding the available capacity of the temporary memory device is not allocated.

However, when the available capacity of the temporary memory device continuously remains small, the coding amount to be allocated to the information signal of a higher complexity cannot be increased. As a result, the coding amount flexibly corresponding to the complexity of the information signal cannot be allocated, which remarkably deteriorates a quality of the coded information signal, in particular, the quality of a high-complexity part.

SUMMARY OF THE INVENTION

Therefore, a main object of the present invention is to provide an information processing device (information recording device or information transmitting device) capable of preventing a part of a high complexity from significantly deteriorating.

Another main object of the present invention is to provide an information processing device (information recording device or information transmitting device) capable of properly allocating a coding amount in accordance with complexity of an information signal even in the case in which a coding average rate of the information signal exceeds a maximum recording rate of a recording medium or a transmission rate of a transmission line.

In order to achieve the foregoing objects, the information processing device (information recording device or information transmitting device) according to the present invention comprises:

a coder for coding an inputted information signal;

a rate controller for controlling a coding rate of the coder in accordance with complexity of the information signal and controlling a coding amount per unit time in the coding process so that an average value of the coding amount can be approximate to an average rate which is previously set;

a temporary memory unit for temporarily memorizing the coded data; and an information processing unit for processing the data memorized in the temporary memory unit. Examples of the information processing unit include a recorder for recording the data memorized in the temporary memory unit on a recording medium and a transmitter for transmitting the data memorized in the temporary memory unit to the transmission line.

The information processing unit measures an information processing rate in the information processing. The rate controller adjusts the average rate so that the average rate is below the information processing rate measured by the information processing unit.

Other than the foregoing function, the rate controller compares a threshold value of a used amount of the temporary memory unit which is previously set and an actually used amount of the temporary memory unit and reduces the average rate when the used amount exceeds the threshold value.

According to the present invention, the information processing device (information recording device or information transmitting device), in which the coding amount can be appropriately allocated in accordance with the complexity of the information signal even in the case in which the coding average rate of the information signal exceeds the information processing rate (recording rate of recording medium or transmission rate of transmission line) so that the high-complexity part can be prevented from significantly deteriorating in its quality, can be provided.

BRIEF DESCRIPTION OF THE DRAWINGS

These and other objects as well as advantages of the invention will become clear by the following description of preferred embodiments and explicit in the appended claims of the invention. Many other benefits of the invention which are not referred to in this specification will come to the attention of those skilled in the art upon implementing the present invention.

FIG. 1 is a block diagram illustrating a constitution of an information recording device according to Embodiment 1 of the present invention.

DETAILED DESCRIPTION OF THE PREFERRED EMBODIMENTS

Figures 2A, 2B:
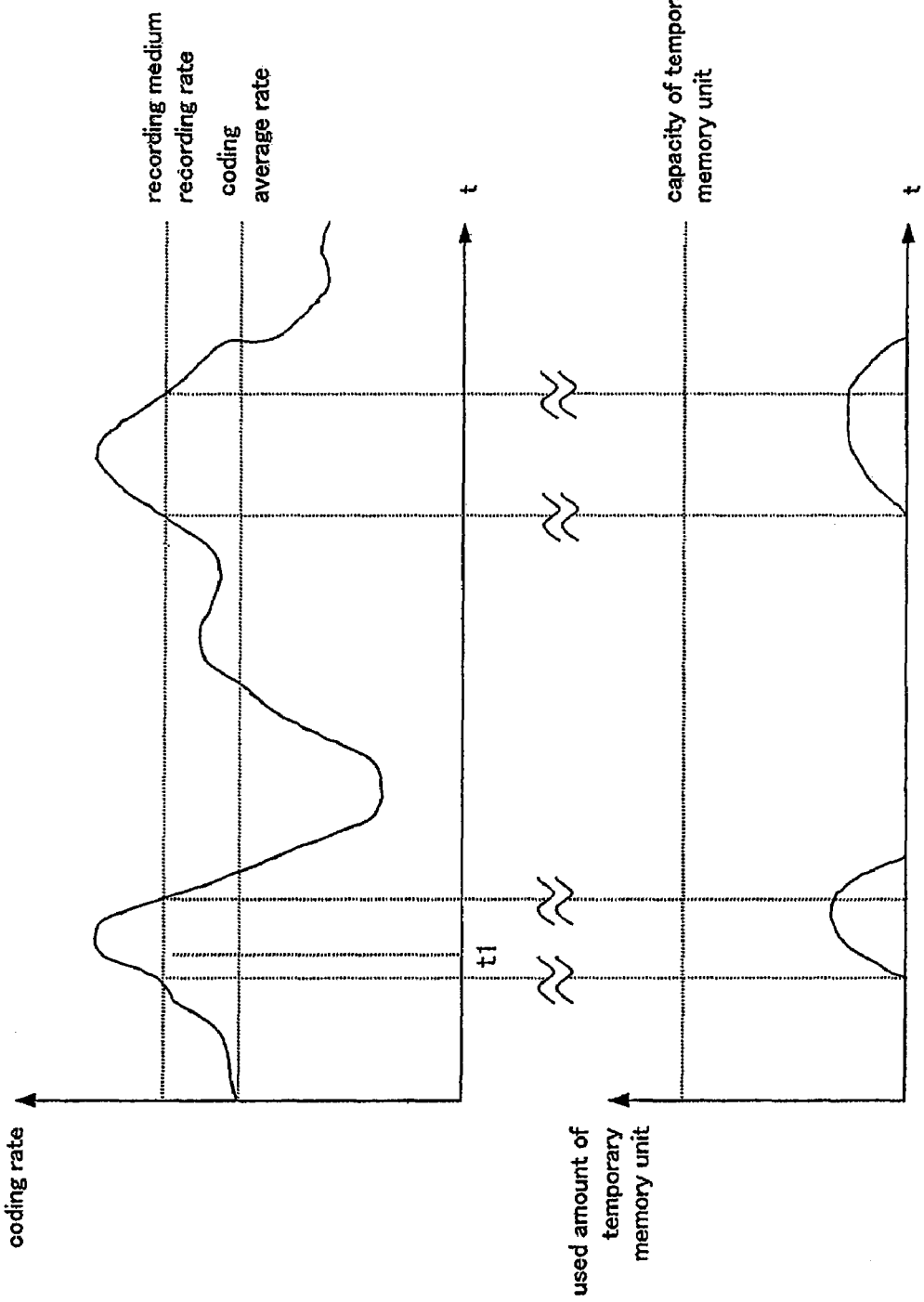
FIG. 2A is an illustration of an example of a rate control operation according to the Embodiment 1.
FIG. 2B is an illustration of an example of a rate control operation according to the Embodiment 1.

Hereinafter, preferred embodiments of the present invention are described referring to the drawings.

Figure 9:
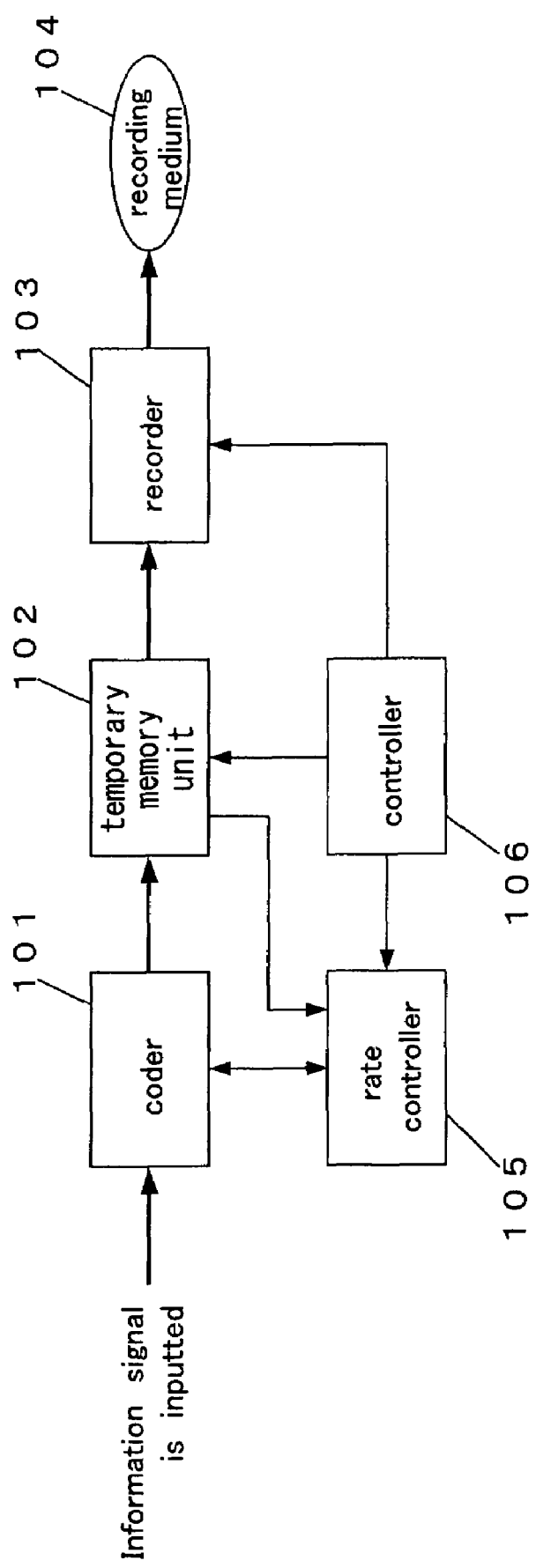
FIG. 9 is a block diagram illustrating a constitution of an information recording device to which the present invention is implemented.

Before the embodiments of the present invention are described, a constitution and an operation of an information recording device as an example of an information processing device employing a variable rate control method, to which the present invention is implemented, are described referring to FIGS. 9, 10A, 10B, 11A and 11B. FIG. 9 is a block diagram illustrating the constitution of the information recording device in which the variable rate control method is employed.

In FIG. 9, an information signal to be recorded is subjected to a predetermined process in a coder 101 and thereafter temporarily stored in a temporary memory unit 102. The post-coding data stored in the temporary memory unit 102 is sequentially recorded on a recording medium 104 by a recorder 103. A controller 106 controls the foregoing successive recording process.

A rate controller 105 serves to control a coding amount to be allocated in accordance with complexity of the inputted information signal. More specifically, the coding amount to be allocated is increased in the case of the information signal of a high complexity, while the coding amount to be allocated is reduced in the case of the information signal of a low complexity. Further, in the variable rate control method, the coding amount is controlled so that an average value of a total coding amount per unit time can be approximate to an average rate.

A controller 106 monitors an available capacity of the temporary memory unit 102, and the rate controller 105 controls a maximum value of the coding amount in accordance with the available capacity so that a system is prevented from breaking down due to the shortage of the available capacity of the temporary memory unit 102.

Figures 10A, 10B:
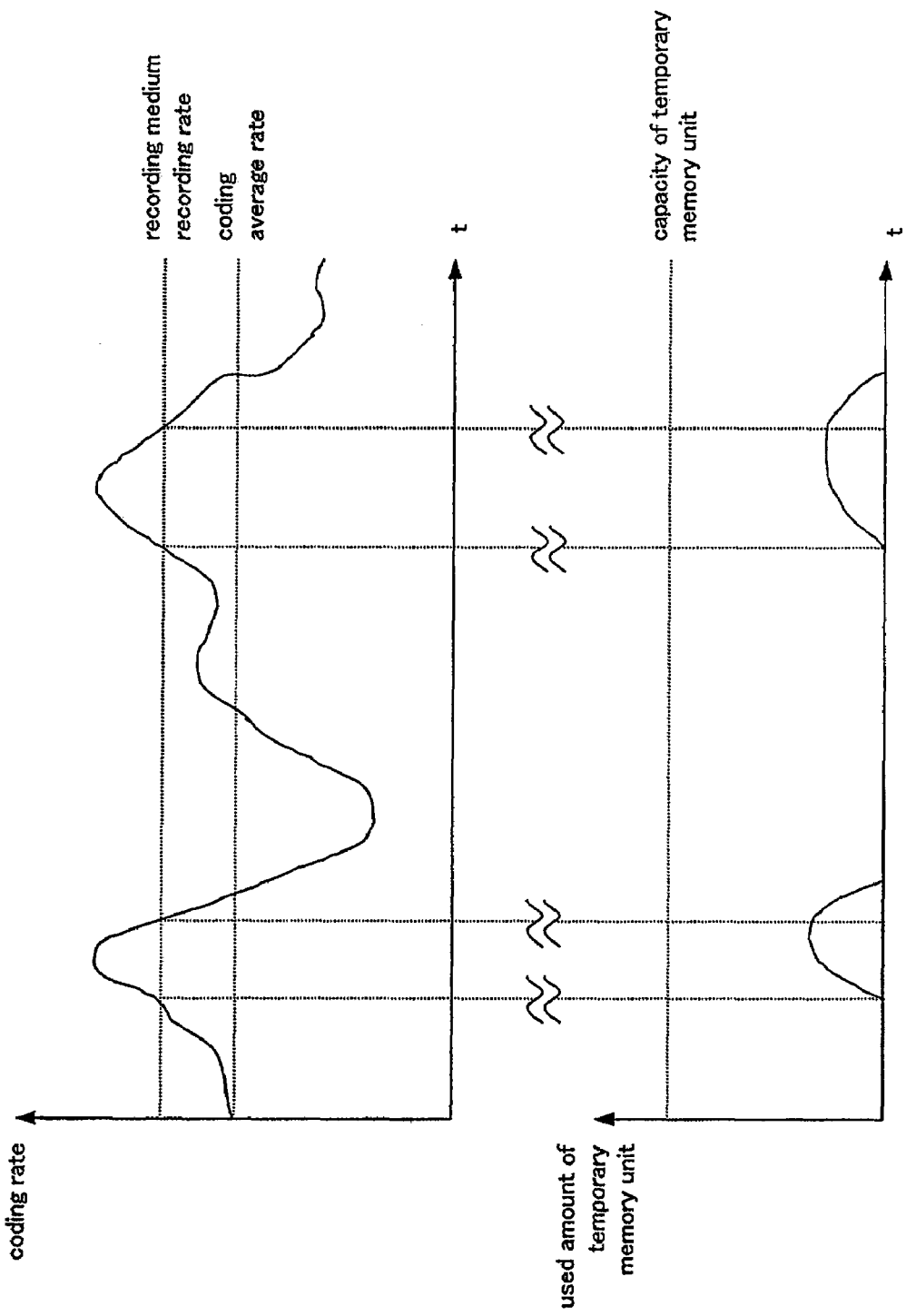
FIG. 10A is an illustration of an example of a rate control operation in the information recording device of FIG. 9.
FIG. 10B is an illustration of an example of a rate control operation in the information recording device of FIG. 9.

FIGS. 10A and 10B respectively show an example of the variable rate control. FIG. 10A shows a temporal transition of the coding amount, and FIG. 10B shows a relevant used amount of the temporary memory unit 102. In FIG. 10A, the rate controller 105 executes the rate control in such manner that the information signal of a high complexity is coded at a coding rate exceeding the average rate, while the information signal of a low complexity is coded at a coding rate lower than the average rate so that the coding rate can be averagely approximate to the average rate on the whole.

FIG. 10B shows the used amount of the temporary memory unit 102. During the time when the coding rate continuously stays below a maximum value of a rate at which the recording from the memory unit 103 to the recording medium 104 can be carried out (hereinafter, referred to as maximum recording rate) the data stored in the temporary memory unit 102 is immediately written in the recording medium 104. Therefore, the data is not retained in the temporary memory unit 102. On the contrary, as soon as the coding rate starts to exceed the maximum recording rate, the data which is coded but has not been recorded yet is stored in the temporary memory unit 102 as recording-standby data. When the coding rate starts to fall below the maximum recording rate, the recording process of the data stored in the temporary memory unit 102 as the recording-standby data is advanced, as a result of which the used amount (storage amount) of the temporary memory unit 102 is gradually lessened.

The rate controller 105 monitors the available capacity of the temporary memory unit 102 and controls the coding amount to prevent the allocation of the coding amount exceeding the available capacity of the temporary memory unit 102.

In recent years, recording rates of recording media such as an optical disk, a hard disk and a semiconductor memory are increasingly improved to be higher, in response to which a recording device adapted to increase a coding rate of the information signal and thereby record the data in a higher quality has been developed to keep up with the ongoing improvement of the recording rates of the recording medium.

However, the recording media currently available include not only a newly-developed recording medium achieving a higher recording rate but also a conventional recording medium still employing a low recording rate, and the recording device is therefore required to perform the recording process with respect to the recording media respectively employing the different recording rates. Accordingly, in some cases, the recording device results in recording the data in the state in which the coding average rate of the information signal exceeds the recording rate of the relevant recording medium.

Figures 11A, 11B:
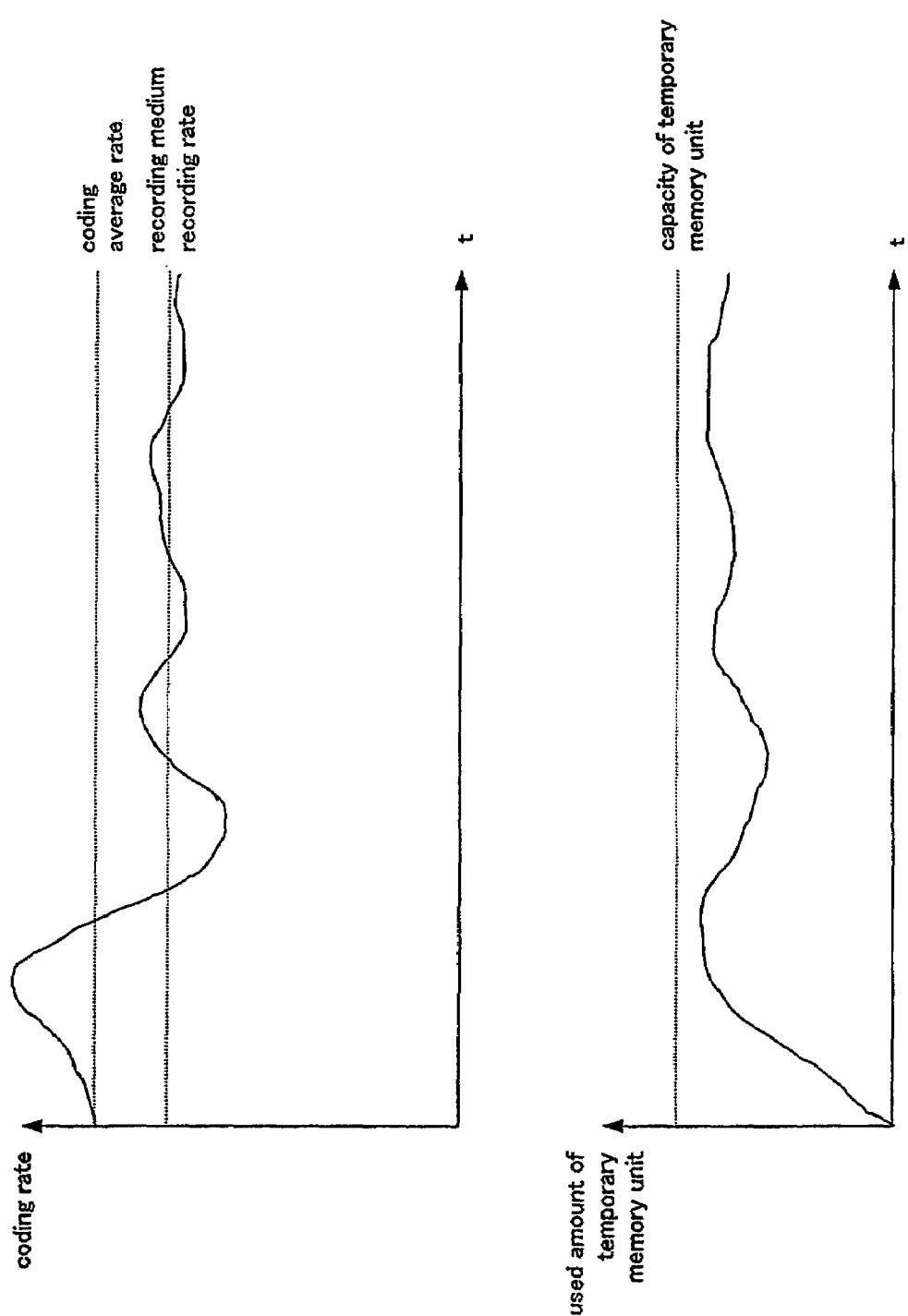
FIG. 11A is an illustration of an example of a rate control operation in the information recording device of FIG. 9.
FIG. 11B is an illustration of an example of a rate control operation in the information recording device of FIG. 9.

FIGS. 11A and 11b respectively show an example of the variable rate control when the coding average rate of the information signal exceeds the maximum recording rate of the recording medium. FIG. 11A shows a temporal transition of the coding amount, and FIG. 11B shows a relevant used amount of the temporary memory unit 102.

As shown in FIG. 11A, in the state in which the coding rate of the information signal is above the maximum recording rate of the recording medium 104, the storage volume of the temporary memory unit 102 gradually increases as shown in FIG. 11B. The rate controller 105, when detecting that the available capacity of the temporary memory unit 102 is gradually lessened, controls the coder 101 so as to control the coding amount (hereinafter, such a control is referred to as first control). At that time, the rate controller 105 also controls the average coding amount per unit time so as to be approximate to the average rate (hereinafter, such a control is referred to as second control). Therefore, when the available capacity of the temporary memory unit 102 is increased as a result of the first control, the coder 101 is soon to be controlled by the second control so as to increase the coding amount. The available capacity of the temporary memory unit 102 consequently remains a small range.

Assuming that an information transmitting device is provided by replacing the recorder 103 and the recording medium 104 shown in FIG. 9 respectively by a transmitter and a transmission line, the device operates in the same manner when a transmission rate of a transmission line falls below the coding average rate.

As described, when the available capacity of the temporary memory unit 102 continuously remains small, the coding amount to be allocated to the information signal of a high complexity cannot be increased. As a result, the coding amount to be allocated cannot respond to the complexity of the information signal, and the quality of the coded information signal, in particular, the quality of the high-complexity part remarkably deteriorates. According to the embodiments of the present invention hereinafter described, the problems mentioned above are solved.

The embodiments of the present invention are hereinafter described referring to the drawings.

Embodiment 1

According to Embodiment 1 of the present invention, the present invention is implemented to the information recording device as an example of the information processing device. FIG. 1 is a block diagram illustrating a constitution of an information recording device according to the Embodiment 1. As shown in FIG. 1, the information recoding device according to the present embodiment comprises a coder 1 for coding an information signal to be recorded (for example, image signal), a temporary memory unit 2A for temporarily storing the coded data, a recording medium 4 on which the data stored in the temporary memory unit 2A is recorded, a recorder 3A for recording the data stored in the temporary memory unit 2A on the recording medium 4 and measuring a recording rate of the recording medium 4 during the recording process, a rate controller 5A for controlling a coding rate in accordance with complexity of the inputted information signal, a controller 6 for generally controlling the successive recording process, and a reproducer 7 for reading the data from the recording medium 4. In the present embodiment, the recorder 3A constitutes the information processing unit.

To describe the complexity more specifically, an image having a picture pattern in which the coding amount is relatively increased and the like based on the same compression rate, or an image which significantly deteriorates when compressed based on the same coding amount is judged to be of a high complexity. More specifically, as a high frequency element included in a two-dimensional image after an orthogonal transformation is executed thereto, which is used for MPEG, increases, the image is judged to be of a higher complexity.

Next, an operation of the information recording device according to the present embodiment is described. The information signal to be recorded is subjected to a predetermined coding process in the coder 1, and thereafter temporarily stored in the temporary memory unit 2A. The post-coding data stored in the temporary memory unit 2A is sequentially recorded on the recording medium 4 by the recorder 3A. At that time, the rate controller 5A measures the complexity of the inputted information signal and serially controls the coding amount for each information signal based on the measurement result (complexity). More specifically, the coding amount to be allocated to a region of the information signal which is judged to be of a high complexity is increased, while the coding amount to be allocated to the information signal measured to have a less complexity is reduced. During the process, the rate controller 5A executes the variable rate control, by which the coding amount is controlled so that the average value of the general coding amount per unit time can be approximate to the designated average rate.

In the rate controller 5A, a predetermined and recorded value is used as the coding average rate to be set. The recorder 3A measures the recording rate in the recording process implemented by the recording medium 4 and transmits the measurement result (recording rate) to the rate controller 5A. As described, according to the present embodiment, the recording rate corresponds to the information processing rate. The rate controller 5A obtains the recording rate for the recording medium 4, which is received from the recorder 3A, and determines and resets the coding average rate so that the coding average rate is equal to or below the recording rate for the recording medium 4.

Figure 3A:
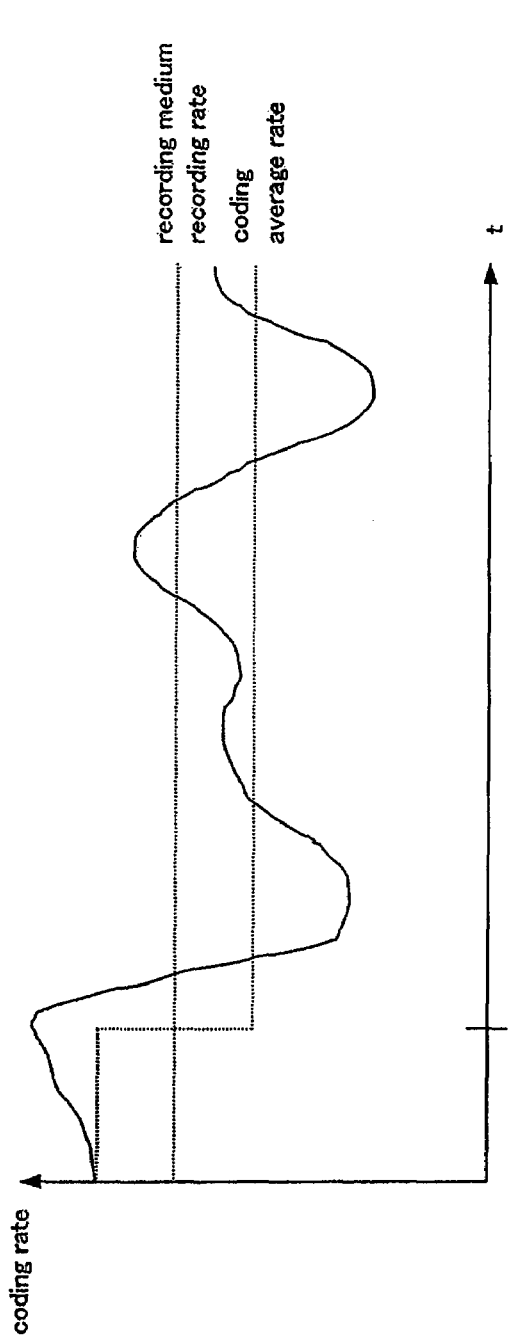
FIG. 3A is an illustration of an example of a rate control operation according to the Embodiment 1.
Figure 3B:
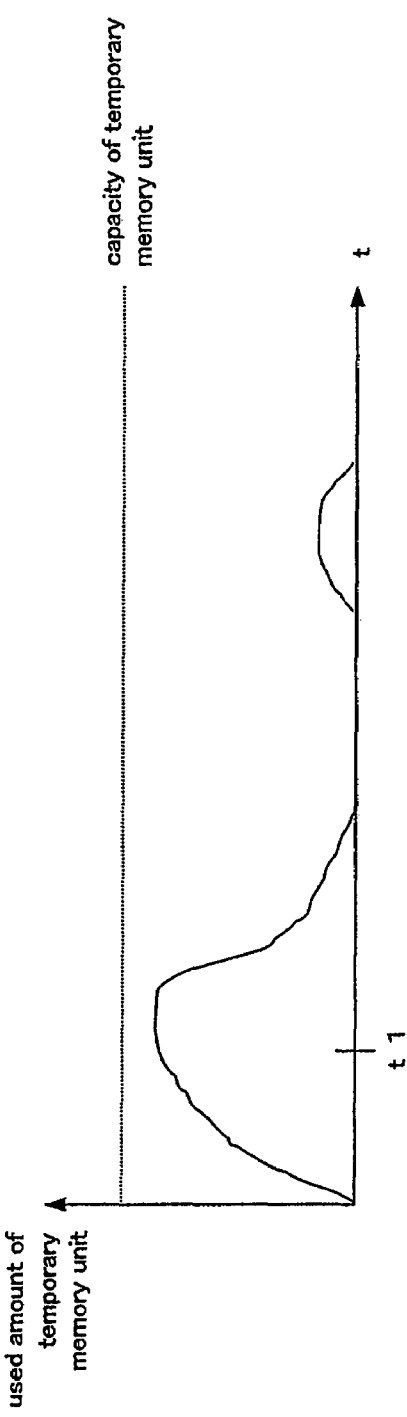
FIG. 3B is an illustration of an example of a rate control operation according to the Embodiment 1.

FIGS. 2A, 2B, 3A and 3B show examples of the rate control in the information recording device according to the present embodiment. FIGS. 2A and 3A respectively show a temporal transition of the coding amount. FIGS. 2B and 3B respectively show a relevant used amount of the temporary memory unit 2A. FIGS. 2A and 2B show an example of the rate control when the coding average rate is set to be equal to or below the recording rate for the recording medium 4. FIGS. 3A and 3B show an example of the rate control when the coding average rate is set to be equal to or above the recording rate for the recording medium 4.

Control when Coding Average Rate is Previously Set to be Below Recording Rate

In the example of the control shown in FIGS. 2A and 2B, the coding average rate is previously set to be below the recording rate, and the average rate is previously recorded in the rate controller 5A. However, the relationship between the coding average rate and the recording rate is unbeknownst to the device side. The rate controller 5A, in an initial stage after the commencement of the control, starts to code the information signal based on the coding average rate set to be lower than the recording rate. The recorder 3A records the data read from the temporary memory unit 2A on the recording medium 4 and simultaneously measures the relevant recording rate, and confirms the recording rate at a time t1. The measurement result of the recording rate is transmitted from the recorder 3A to the rate controller 5A. The rate controller 5A renders the judgment that the received measurement result of the recording rate is higher than the recorded coding average rate. The rate controller 5A, based on the foregoing judgment, does not change the recorded average rate and continuously uses it for the coding process.

After the initial control is carried out, the rate controller 5A instructs the coding process by the coder 1 and the recording process by the recorder 3 to be continued, and monitors the complexity of the control signal to be coded to verify whether or not it is high. In a temporal region of the information signal judged to have a high complexity, as shown in FIG. 2, the coding process is carried out at a coding rate exceeding the predetermined average rate. In a temporal region of the information signal judged to have a low complexity, the coding process is carried out at a coding rate below the average rate. Thereby, the coding rate is controlled by the rate controller 5A so that the average value of the coding rate can be approximate to the average rate. Therefore, the coding process is carried out at a high coding rate in the temporal region of the information signal of the high complexity in order to prevent the deterioration of the signal, while the coding process is carried out at a low coding rate in the temporal region of the information signal of the low complexity in order to prevent the allocation of any redundant code.

In a temporal region in which the coding rate variable in response to the control does not exceed the recording rate of the recorder 3A, as shown in FIG. 2B, the data stored in the temporary memory unit 2A is immediately written in the recording medium 4 via the recorder 3A. Therefore, the information signal is not stored in the temporary memory unit 2A in the foregoing temporal region.

In a temporal region in which the coding rate variable in response to the control exceeds the recording rate of the recorder 3A, any data which has not been recorded yet is sequentially stored in the temporary memory unit 2A as the recording-standby data. In the arrival of a temporal region in which the coding rate variable in response to the control falls below the recording rate, the data stored in the temporary memory unit 2A is read from the temporary memory unit 2A and written in the recording medium 4. The data storage volume (used amount) of the temporary memory unit 2A is thereby gradually lessened.

Control when Coding Average Rate is Previously Set to be Higher than Recording Rate In the example of the control shown in FIGS. 3A and 3B, the coding average rate is set to be higher than the recording rate, and the average rate is previously recorded in the rate controller 5A, though the relationship between the coding average rate and the recording rate is unbeknownst to the device side. The rate controller 5A, in the initial stage after the commencement of the control, starts to code the information signal based on the coding average rate set to be higher than the recording rate. The recorder 3A records the data read from the temporary memory unit 2A on the recording medium 4 and simultaneously measures the relevant recording rate, and confirms the recording rate at the time t1. The measurement result of the recording rate is transmitted from the recorder 3A to the rate controller 5A. The rate controller 5A renders the judgment that the received measurement result of the recording rate is higher than the recorded coding average rate. The rate controller 5A, based on the foregoing judgment, resets the average rate so as to fall below the recording rate. The rest of the control operation is the same as described in FIGS. 2A and 2B.

Thus, in the information recording device according to the present embodiment, when the previously set coding average rate exceeds the recording rate of the recording medium, the average rate is reset so as to fall below the recording rate. In such a manner, the rate control can be properly executed in such manner that the coding amount to be allocated to the information signal of a high complexity is increased and the coding amount to be allocated to the information signal of a low complexity is reduced.

The recording rate can be measured in the recorder 3A, for example, as follows. A response time from the time when the recording is ordered to the time when the recording is completed with respect to the recording medium 4 is measured, and the recording rate can be calculated from the response time and the data volume recorded in response to the recording order. As an alternative method, a predetermined volume of data is consecutively recorded on the recording medium 4, and the recording rate can be calculated from a time length required for recording all of the data and the recorded data volume. However, the measurement method is not limited to the foregoing examples allowing any other method to be employed as far as the recording rate can be measured.

As an example of the recording medium 4, there is a recording medium whose recording rate or information relating to the recording rate is previously memorized in a predetermined memory region of the medium itself. When the recording medium 4 of the foregoing type is used, the information relating to the recording rate recorded on the recording medium 4 may be read out via the reproducer 7 and used, which eliminates the measurement of the recording rate.

In the foregoing example, the recording rate is measured in the predetermined time length t1 after the commencement of the recording, and the coding average rate is determined based on the measurement result of the recording rate. In such a case, the average rate is thereafter continuously used to implement the coding process. However, the recording rate of the recording medium 4 may change over time. In order to deal with the situation, the recording rate may be continuously measured during the recording process so that the recording rate is successively renewed. When the foregoing method is employed, if there is any change in the recording rate successively renewed, the coding average rate may be changed in compliance with the change of the recording rate.

The recording rate may be measured in the recorder 3A prior to the commencement of the coding process of the information signal.

The following constitution is also possible. The recorder 3A, when detecting that the recording medium 4 as a recording object is exchanged, informs the rate controller 5A of the exchange. The rate controller 5A is notified of the exchange of the recording medium 4 by the recorder 3A and accordingly changes the currently set average rate back to an initial value which is previously set. In the foregoing manner, the control operation flexibly responding to the change of the recording medium 4 can be carried out.

When the recording medium 4 is changed, the recording medium 4 newly set in the information recording device may possibly have been used for the recording process in the same information recording device. In such a case, it is preferable to reuse the average rate set in the previous recording process in order to improve the control efficiency and control precision. Below is described a constitution in the case of executing the foregoing control operation.

First, a control manner in which the average rate is written in the recording medium 4 to be used is described. In the control manner, the recorder 3A writes the average rate set by the rate controller 5A in the recording medium 4 during the recording process. The recorder 3A continues to record the average rate during the time when information recording process is continued, and the most update average rate is thereby recorded on the recording medium 4.

After the recording process is completed and the recording medium 4 is removed from the recorder 3A, and then, the recording medium 4 is set in the recorder 3A again, the reproducer 7 reads the information from the recording medium 4 when the recording medium 4 is set. Further, the reproducer 7 transmits the read information to the rate controller 5A. The rate controller 5, if the information relating to the average rate is stored in the received information, sets the average rate as an initial value of the average rate of the newly set recording medium 4. When the foregoing control operation is executed, the average rate set in the recording medium 4 in the previous recording process can be reused as the initial value of the average rate when the recording process is implemented to the recording medium 4 again.

Next is described a control manner in which the information recording device includes a constitution for memorizing the average rate and the recording rate. In the foregoing control manner, it is necessary to previously write individual identification information in the recording medium 4 and also to additionally provided a memory unit 8 in the information recording device as shown in FIG. 1. The individual identification information of the recording medium 4 may be the individual identification information recorded by a manufacturer before the product shipment. Alternatively, the individual identification information may be newly set in the information recording device and then written in the recording medium 4 via the recorder 3A.

Next, the foregoing control operation is described in detail. When the recording medium 4 is set in the information recording device, the reproducer 7 reads the individual identification information of the recording medium 4 written therein and transmits it to the controller 6. Then, the information recording device records the coded information on the recording medium 4. During the recording process, the rate controller 5A associates the recording rate of the recording medium 4 measured by the recorder 3A and the average rate set by the rate controller 5A with the received individual identification information of the recording medium 4 and instructs the memory unit 8 to memorize it.

After the recording process is completed and the recording medium 4 is removed from the recorder 3A, and then, the recording medium 4 is set in the information recording device again, the reproducer 7 reads the individual identification information of the set recording medium 4 and transmits it to the rate controller 5A. The rate controller 5A judges whether or not the recording rate and the average rate associated with the individual identification information read by the reproducer 7 are in the recorder 8. When it is judged that the information relating to the rates is present in the recorder 8, the rate controller 5A reads the information from the recorder 8 and sets the read recording rate and average rate as the initial values of the recording rate and the average rate of the recording medium 4 newly set. When the foregoing control operation is implemented, the average rate and the recording rate set in the recording medium 4 in the previous recording process can be reused as the initial values of the average rate and the recording rate when the recording process is implemented to the recording medium 4 again.

Embodiment 2

Figure 4:
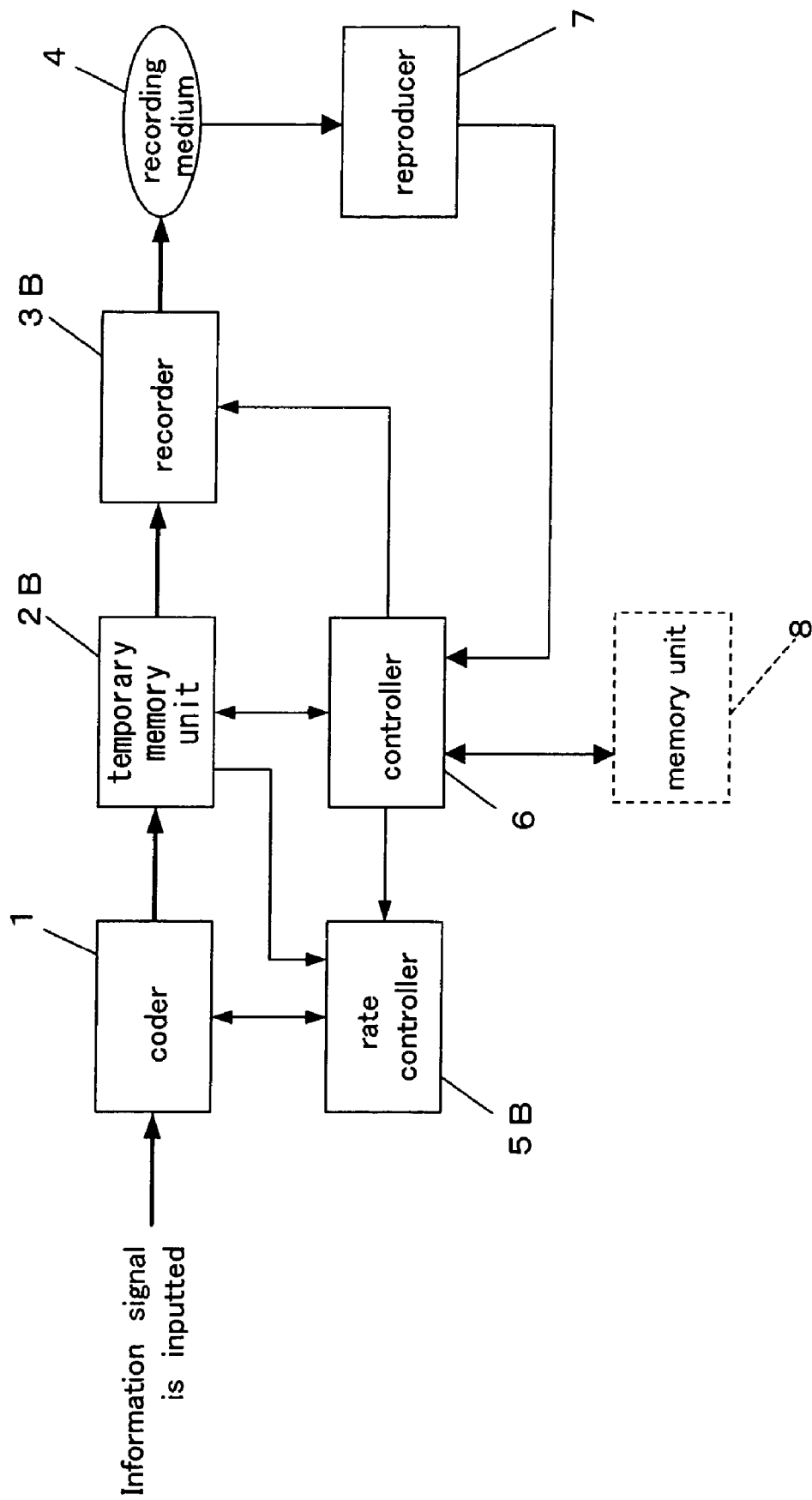
FIG. 4 is a block diagram illustrating a constitution of an information recording device according to Embodiment 2 of the present invention.

According to Embodiment 2 of the present invention, the present invention is implemented to the information recording device as the information processing device. FIG. 4 is a block diagram illustrating a constitution of an information recording device according to the Embodiment 2. As shown in FIG. 4, the information recording device according to the present embodiment comprises a coder 1, a temporary memory unit 2B, a recorder 3B, a recording medium 4, a rate controller 5B, a controller 6, a reproducer 7 and a recorder 8. Of the foregoing components, the coder 1, temporary memory unit 2B, recorder 3B, recording medium 4, controller 6, reproducer 7 and recorder 8 are basically adapted to function in the same manner as in the Embodiment 1. In the present embodiment, the recorder 3B constitutes the information processing unit. However, the recorder 3B does have the function of measuring the recording rate and the function of transmitting the measured recording rate to the rate controller 5B. The present embodiment is characterized in the control operations implemented by the temporary memory unit 2B and the rate controller 5B. According to the present embodiment, the recording rate corresponds to the information processing rate.

Next, an operation of the information recording device according to the present embodiment is described. The recording process of the information processing device according to the present embodiment is basically the same as in the Embodiment 1. However, the average rate is adjusted based on the result of comparing the recording rate and the average rate in the Embodiment 1. In contrast, according to the present embodiment, the average rate is adjusted based on a result of comparing the used amount of the temporary memory unit 2B and a threshold value thereof. Below is given the detailed description.

In the rate controller 5B, a predetermined value is used as the coding average rate to be set. The rate controller 5B constantly monitors the current used amount (data storage volume) of the temporary memory unit 2B. The rate controller 5B compares the used amount (data storage volume) of the temporary memory unit 2B being currently monitored and the threshold value of the used amount of the temporary memory unit 2B which is previously recorded and determines and resets the coding average rate so that the monitoring result (measured value of used amount) is equal to below the threshold value.

More specifically, when the used amount of the temporary memory unit 2B exceeds the predetermined threshold value, the coder 1 is controlled so as to reduce the coding average rate, and in particular, the coder 1 is preferably controlled so as to reduce the average rate through stages. When the used amount of the temporary memory unit 2B continuously stays below the threshold value, the coding average rate may be increased, in which case the coding average rate is preferably increased through stages.

Figures 5A, 5B:
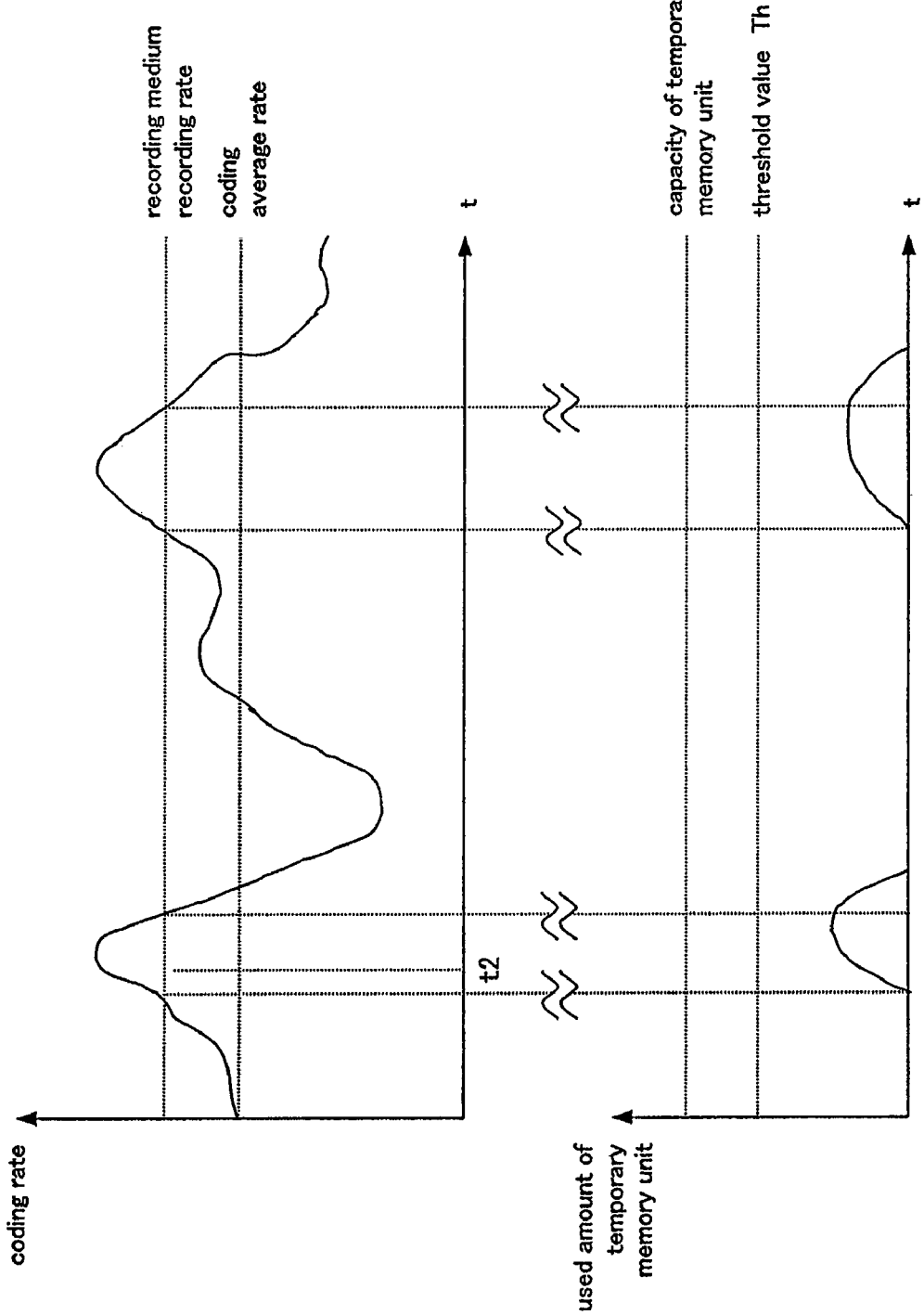
FIG. 5A is an illustration of an example of a rate control operation according to the Embodiment 2.
FIG. 5B is an illustration of an example of a rate control operation according to the Embodiment 2.
Figures 6A, 6B:
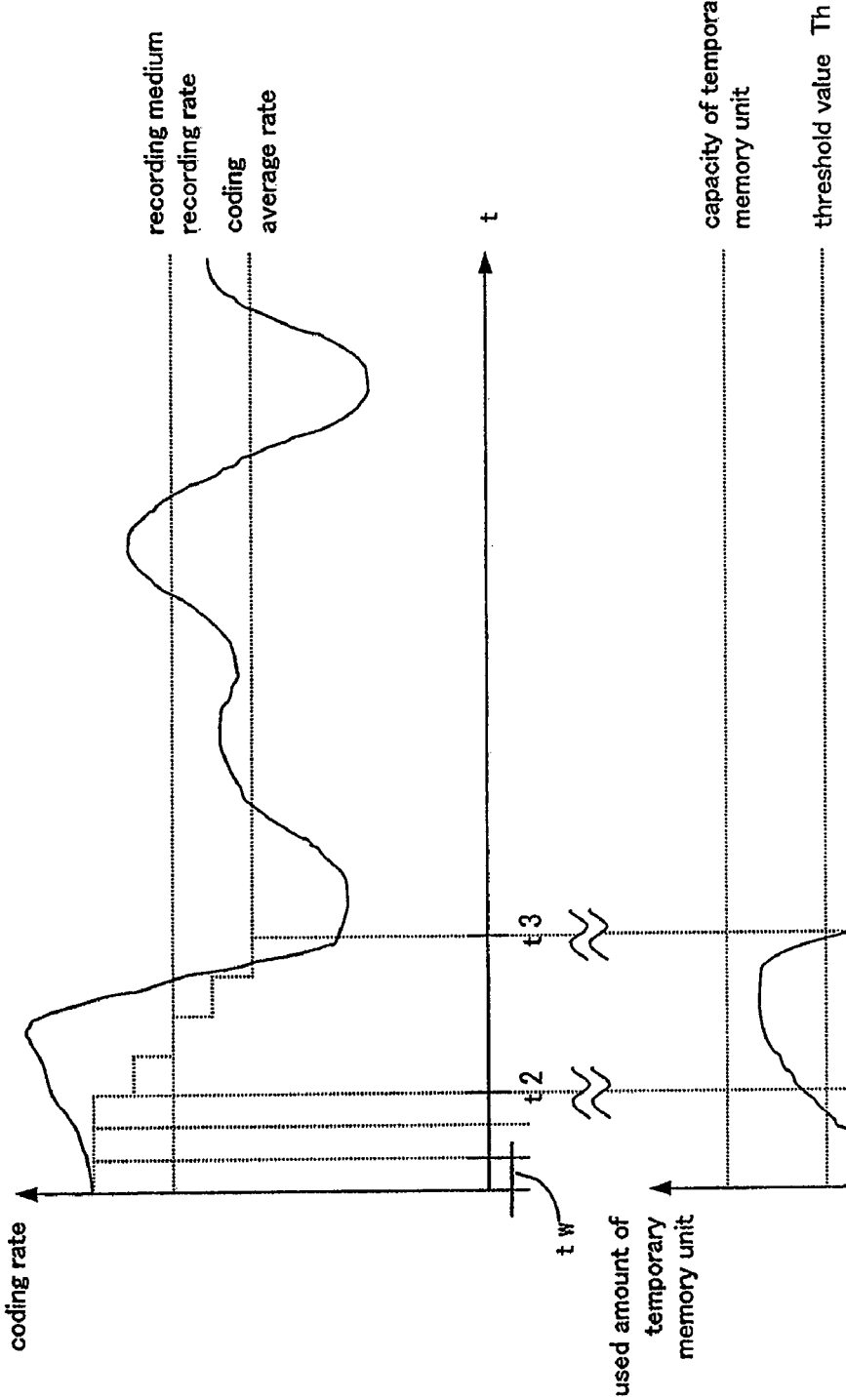
FIG. 6A is an illustration of an example of a rate control operation according to the Embodiment 2.
FIG. 6B is an illustration of an example of a rate control operation according to the Embodiment 2.

Next, examples of the rate control in the information recording device according to the present embodiment are described referring to FIGS. 5A, 5B, 6A and 6B. FIGS. 5A and 6A respectively show a temporal transition of the coding amount, while FIGS. 5B and 6B respectively show the relevant used amount of the temporary memory unit 2B. FIGS. 5A and 5B show the example of the rate control in which the coding average rate is set to equal to or lower than the recording rate for the recording medium 4. FIGS. 6A and 6B show the example of the rate control in which the coding average rate is set to be equal to or above the recording rate for the recording medium 4.

In the information recording device according to the present embodiment, a threshold value Th is set for the used amount of the temporary memory unit 2B, and the set threshold value Th is memorized in the rate controller 5B. The threshold value Th corresponds to a relationship between the average rate and the recording rate set in the information recording device. To be more specific, the coding average rate can be judged to be more possibly below the recording rate when the used amount of the temporary memory unit 2B is equal to or below the threshold value Th. On the contrary, the coding average rate can be judged to be more possibly above the recording rate when the used amount of the temporary memory unit 2B exceeds the threshold value Th. The threshold value Th is previously set to such a value that presumably enables the foregoing judgments to be made.

The foregoing judgments can be made based on the phenomenon that the used amount of the temporary memory unit 2B is increased (stored data volume is increased) when the coding average rate is higher than the recording rate and the coding process consequently more advances than the recording process. The rate controller 5B, taking advantage of the phenomenon, sets the threshold value Th and monitors the used amount of the temporary memory unit 2B using the threshold value Th so that the relationship between the average rate and the recording rate can be indirectly accurately known. The used amount of the temporary memory unit 2B (data storage volume) is calculated from, for example, a relative difference between the first address at which the data writing starts and the last address at which the data writing ends of the temporary memory unit 2B.

Control when Coding Average Rate is Previously Set to be Lower than Recording Rate In the control example shown in FIGS. 5A and 5B, the coding average rate is previously set to be lower than the recording rate, and the average rate is previously memorized in the rate controller 5B. However, the relationship between the two rates is not grasped on the device side. When the control starts, the rate controller 5B initially starts to code the information signal based on the coding average rate set to be lower than the recording rate. The rate controller 5B measures the used amount of the temporary memory unit 2B and confirms the used amount at a time t2. The measurement result of the used amount of the temporary memory unit 2B does not exceed the recorded threshold value and constantly stays at a low level. The rate controller 5B detects the foregoing state and continuously uses the recorded average rate without changing it for the coding process.

After the initial control operation is implemented, the rate controller 5B instructs the coder 1 and the recorder 3B to respectively continue the coding process and the recording process. Then, the rate controller 5B monitors whether or not complexity of the control signal to be coded is high. In a temporal region in which the information signal is judged to have a high complexity, as shown in FIG. 5B, the coding process is carried out at a coding rate higher than the previously set average rate, while the coding process is carried out at a coding rate lower than the average rate in a temporal region of the information signal judged to have a low complexity. Thereby, the coding rate is controlled by the rate controller 5B so that the average value of the coding rate can be approximate to the average rate. Therefore, the coding process is carried out at a high coding rate in the temporal region of the information signal having a high complexity so that the signal is not deteriorated, while the coding process is carried out at a low coding rate in the temporal region of the information signal having a low complexity to prevent the allocation of any redundant code.

As shown in FIG. 5, the variation state of the cording rate by the foregoing control and the variation state of the used amount of the temporary memory unit 2B consequently conforms to the control state shown in FIG. 2B.

Control when Coding Average Rate is Previously Set to be Higher than Recording Rate In the control example shown in FIGS. 6A and 6B, the coding average rate is previously set to be higher than the recording rate, and the average rate is previously recorded in the rate controller 5B. However, the relationship between the two rates is not grasped on the device side. In the initial stage after the control starts, the rate controller 5B starts to code the information signal based on the coding average rate set to be higher than the recording rate. After the coding process starts, the rate controller 5B measures the used amount of the temporary memory unit 2B at each predetermined period tw. Because the coding average rate is set to be higher than the recording rate, the used amount of the temporary memory unit 2B exceeds the recorded threshold value Th in a certain period of time after the measurement starts (after the passage of a plurality of periods (tw×n)). Therefore, the rate controller 5B measuring the used amount of the temporary memory unit 2B judges that the measurement result exceeds the threshold value Th. Then, the rate controller 5B judges it is highly possible that the current coding average rate exceeds the set recording rate. As a result of making the judgment, the rate controller 5B resets the coding average rate to a slightly lower value than the current value. After that, the coding process and the recording process are continued.

The measurement of the used amount of the temporary memory unit 2B, the comparison of the measurement result and the threshold value Th and the resetting of the average rate based on the comparison result are repeatedly carried out per period tw. Accordingly, the coding average rate gradually decreases until the used amount of the temporary memory unit 2B equals to or falls below the threshold value Th. In FIG. 6A, the used amount of the temporary memory unit 2B starts to equal to or fall below the threshold value at a time t3.

A control method after the used amount of the temporary memory unit 2B exceeding the threshold value Th is reduced to the threshold value Th or below is implemented as follows.

First Control Method

In a first control method, the measurement of the used amount of the temporary memory unit 2B and the comparison of the measurement result and the threshold value Th are continuously repeated per period tw, and the average rate is increased every time when it is judged from the comparison result that the measurement result of the used amount is below the threshold value Th. Thereby, the coding average rate is gradually increased until the used amount of the temporary memory unit 2B equals to or exceeds the threshold value Th.

In the foregoing process, it is preferable to provide a difference between a range of reduction in implementing the control operation of reducing the coding average rate and a range of increase in implementing the control operation of increasing the coding average rate. To be specific, in the former control operation, the range of reduction is increased to quickly follow the variation of the recording rate so that the system breakdown can be prevented, and in the latter control operation, the range of increase is reduced to slowly follow the variation of the recording rate so that any fluctuation in the image quality is prevented.

Further, the threshold value Th in implementing the control operation of reducing the coding average rate and the threshold value Th in implementing the control operation of increasing the coding average rate may be different values, which are memorized in the rate controller 5B to be used.

Second Control Method

In a second control method, the coding average rate set when the used amount of the temporary memory unit 2B exceeding the threshold value Th is reduced to the threshold value Th or below (time t3 in FIG. 6B) is thereafter maintained without change. FIGS. 6A and 6B show a result obtained based on the second control method.

Thus, even when the coding average rate which is previously set exceeds the recording rate of the recording medium, the average rate can be set to be below the recording rate. As a result, the rate control can be properly carried out in such manner that an increased coding amount is allocated to the information signal of a higher complexity and an reduced coding amount can be allocated to the information signal of a lower complexity.

The present embodiment can employ the following constitution. The recorder 3B, when detecting that the recording medium 4 as the recording object is exchanged, informs the rate controller 5B of the exchange. The exchange of the recording medium 4 may be detected from the information of the recording medium 4 read by the reproducer 7. The rate controller 5B is informed of the exchange of the recording medium 4 by the recorder 3B and accordingly resets the currently set average rate to the previously set initial value. Thereby, the control operation in compliance with the change of the recording medium 4 can be executed.

When the recording medium 4 is changed, the recording medium 4 newly set in the information recording device may possibly have been subjected to the recording process in the past. In such a case, the average rate set in the previous recording process is preferably reused in terms of the control efficiency and control precision. Below is described a constitution in the case of reusing the average rate.

First, a control manner in which the average rate is written in the recording medium 4 to be used is described. The recorder 3B writes the average rate set by the rate controller 5B in the recording medium 4 during the information recording process. The recorder 3B continues to record the average rate on the recording medium 4 while the recording process is continued, and the most update average rate is thereby recorded on the recording medium 4.

When the recording medium 4 is set in the information recording device again after the information recording process is completed and the recording medium 4 is removed from the information recording device, the reproducer 7 first reads the information from the recording medium 4 and transmits the information to the rate controller 5B when the recording medium 4 is set. The rate controller 5B, if the information relating to the average rate is included in the information transmitted from the reproducer 7, sets the average rate as an initial value of the average rate of the recording medium 4 newly set in the device. In the foregoing manner, the average rate set in the recording medium 4 in the previous recording process can be reused as the initial value of the average rate when the recording process is executed to the recording medium 4 again.

Next is described a control manner in which a constitution for memorizing the average rate is provided in the information recording device to be used. In the control manner, it is necessary to previously write the individual identification information in the recording medium 4 and, as shown in FIG. 4, to additionally provide the memory unit 8 in the information recording device. The individual identification information of the recording medium 4 may be such information recorded by a manufacturer before the product shipment, or the information may be newly set in the information recording device and then written in the recording medium 4 via the recorder 3B.

Next, the foregoing control operation is described in detail. When the recording medium 4 is set in the information recording device, the reproducer 7 reads the individual identification information written in the recording medium 4 and transmits it to the controller 6. Then, the information recording device records the coded information on the recording medium 4. During the recording process, the rate controller 5B associates the average rate set by the rate controller 5B with the received individual identification information of the recording medium 4 and instructs the memory unit 8 to memorize it.

When the recording medium 4 is set in the information recording device again after the recording process is completed and the recording medium 4 is removed from the information recording device, the reproducer 7 reads the individual identification information of the set recording medium 4 and transmits it to the rate controller 5B. The rate controller 5B judges whether or not the information of the average rate associated with the individual identification information read by the reproducer 7 is in the recorder 8, and if the information of the average rate is present in the recorder 8, reads the information from the recorder 8 to thereby set the read average rate as an initial value of the average rate of the recording medium 4 newly set. As a result of implementing the foregoing control operation, the average rate set in the recording medium 4 in the previous recording process can be reused as the initial value of the average rate when the recording process is implemented to the recording medium 4 again.

The rate controller 5B may increase the average rate in adjusting the average rate. In such a case, the average rate is set to stay below the initial value of the average rate. More specifically, it is preferable to control the average rate to be set so as to constantly fall below the initial value of the average rate, which improves the control precision.

Embodiment 3

Figure 7:
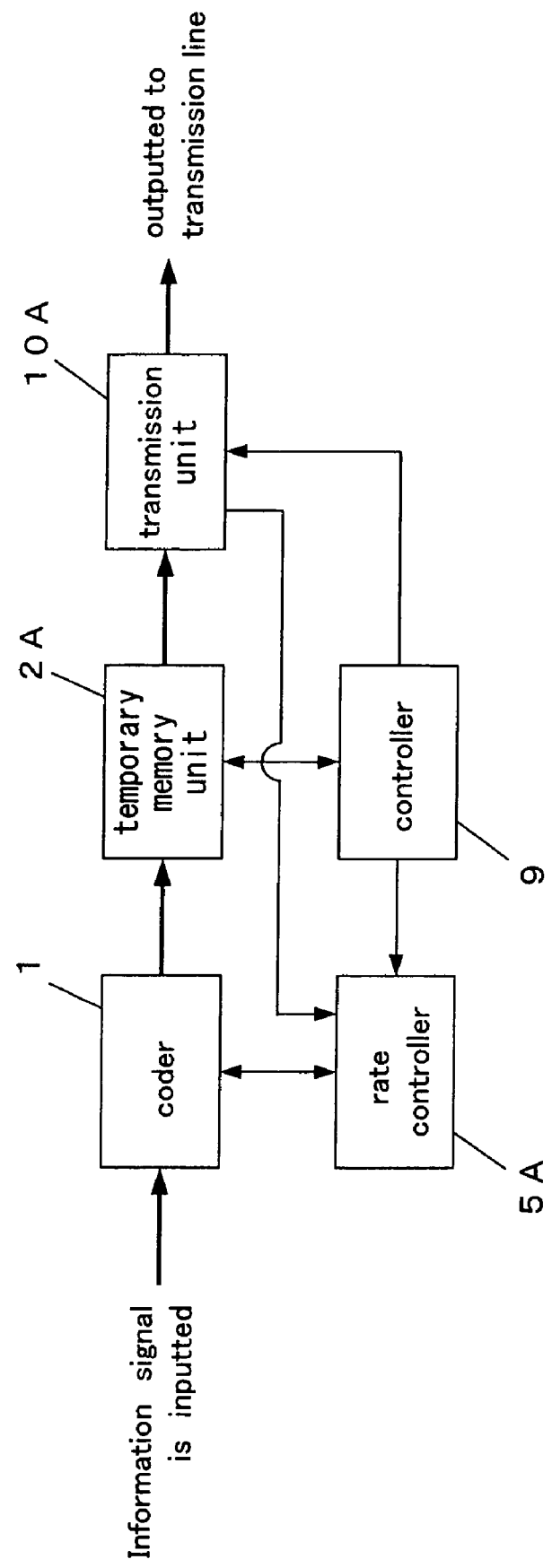
FIG. 7 is a block diagram illustrating a constitution of an information transmitting device according to Embodiment 3 of the present invention.

According to Embodiment 3 of the present invention, the present invention is implemented to the information transmitting device as the information processing device. FIG. 7 is a block diagram illustrating a constitution of an information transmitting device according to the Embodiment 3. The constitution of the information transmitting device according to the Embodiment 3 is described referring to FIG. 7.

As shown in FIG. 7, the information transmitting device according to the present embodiment comprises a coder 1 for coding an information signal to be transmitted, a temporary memory unit 2A for temporarily storing the coded data, a rate controller 5A for controlling a coding rate in accordance with the complexity of the inputted information signal, a transmitter 10A for transmitting the data stored in the temporary memory unit 2A to a transmission line and measuring a transmission rate of the transmission line and a controller 9 for generally controlling the successive recording process. In the present embodiment, the transmitter 10A constitutes the information processing unit.

The information transmitting device according to the present embodiment employs the same constitution and control method for coding the information signal as in the Embodiment 1. The information transmitting device according to the present embodiment is different to the information recording device according to the Embodiment 1 in that the coded signal is not recorded on the recoding medium 4 but transmitted to the transmission line. Therefore, any identical or similar component is provided with the same reference symbol.

Next, an operation of the information transmitting device according to the present embodiment is described. The information signal to be transmitted is subjected to a predetermined coding process in the coder 1, and then, temporarily stored in the temporary memory unit 2A. The coded data stored in the temporary memory unit 2A is sequentially transmitted to the transmission line by the transmitter 10A. The rate controller 5A controls the coding amount to be allocated in accordance with the complexity of the inputted information signal. The control method for the coding amount to be allocated is the same as in the Embodiment 1.

The rate controller 5A records and uses a predetermined value as the coding average rate while executing the following control. The rate controller 5A obtains the transmission rate of the transmission line from the transmitter 10A and compares the transmission rate to the coding average rate. Then, the rate controller 5A resets the coding average rate so as to equal to or fall below the transmission rate. In the present embodiment, the transmission rate corresponds to the information processing rate.

The rate control of the information transmitting device according to the present embodiment is not any different to the description in the Embodiment 1, and therefore is not described here again. The rate is controlled in such manner as shown in FIGS. 2A, 2B, 3A and 3B. To read the transmission rate of the transmission rate instead of the recording rate of the recording medium in the Embodiment 1 results in the transmission rate control according to the present embodiment.

As described, when the coding average rate which is previously set exceeds the transmission rate of the transmission line, the average rate can be set to fall below the transmission rate. Accordingly, the rate control can be properly carried out in such manner that the coding amount to be allocated to the information of a higher complexity can be increased and the coding amount to be allocated to the information signal of a low complexity can be reduced.

The transmission rate can measured in the transmitter 10A as follows. A response time from the time when the transmission is ordered to the time when the transmission is complete dismeasured while the transmission to the transmission line is continued. The transmission rate is calculated from the response time and a data volume transmitted according to the transmission order. As an alternative method, a predetermined volume of data is continuously transmitted via the transmission line, and the transmission rate can be calculated from a time length consumed until the transmission of all of the data is completed and the transmitted data volume. However, there is no limitation to the calculation method as far as the transmission rate can be measured.

Further, a transmission rate when the transmission line is established may be used as the transmission rate of the transmission line.

The average rate can be set in such manner that the transmission rate is measured within a predetermined time length after the transmission starts, and the coding average rate is determined in compliance with the measured value of the transmission rate without ever changing the average rate thereafter. In order to prepare for any change of the transmission rate of the transmission line over time, however, the transmission rate may be continuously measured during the transmission so as to change the coding average rate in compliance with the change of the transmission rate, if any. Further, the transmission rate may be measured in the transmitter 10A before the coding process of the information signal starts.

Embodiment 4

Figure 8:
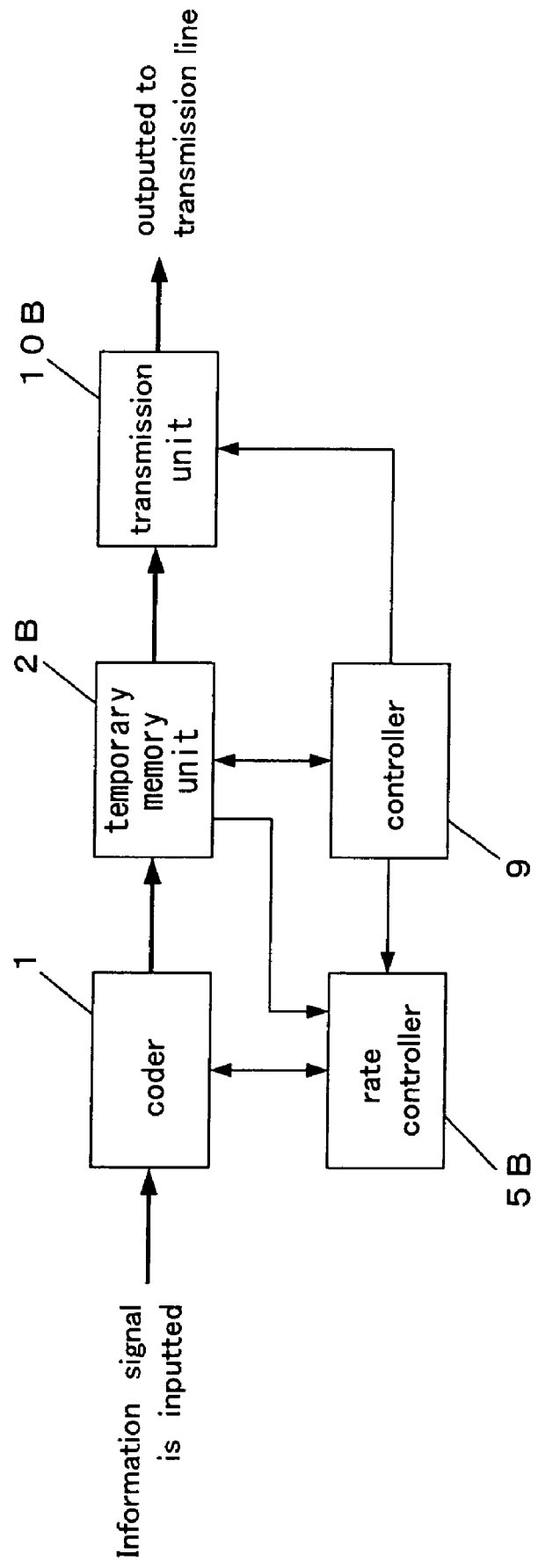
FIG. 8 is a block diagram illustrating a constitution of an information transmitting device according to Embodiment 4 of the present invention.

According to Embodiment 4 of the present invention, the present invention is implemented to the information transmitting device as the information processing device. FIG. 8 is a block diagram illustrating a constitution of an information transmitting device according to the Embodiment 4. A constitution of the information transmitting device according to the present embodiment is described referring to FIG. 8.

As shown in FIG. 8, the information transmitting device according to the present embodiment comprises a coder 1 for coding an information signal to be transmitted, a temporary memory unit 2A for temporarily storing the coded data, a rate controller 5A for controlling a coding rate in accordance with the complexity of the inputted information signal, a transmitter 10B for transmitting the data stored in the temporary memory unit 2A to a transmission line and measuring a transmission rate of the transmission line and a controller 9 for generally controlling the successive recording process. In the present embodiment, the transmitter 10B constitutes the information processing unit.

The information transmitting device according to the present embodiment employs the same constitution and control method for coding the information signal as in the Embodiment 2. The information transmitting device according to the present embodiment is different to the information recording device according to the Embodiment 2 in that the coded signal is not recorded on the recoding medium 4 but transmitted to the transmission line. Therefore, any identical or similar component is provided with the same reference symbol.

Next, an operation of the information transmitting device according to the present embodiment is described. The information signal to be transmitted is subjected to a predetermined coding process in the coder 1, and then, temporarily stored in the temporary memory unit 2A. The coded data stored in the temporary memory unit 2A is sequentially transmitted to the transmission line by the transmitter 10A. The rate controller 5A controls the coding amount to be allocated in accordance with the complexity of the inputted information signal. The control method for the coding amount allocated is the same as in the Embodiment 2.

The rate controller 5A records and uses a predetermined value as the coding average rate while executing the following control. The rate controller 5$b$ monitors the usage amount of the temporary memory unit 2A and compares it to the threshold value Th. Then, the rate controller 5B determines and resets the coding average rate in accordance with the comparison result. According to the present embodiment, the transmission rate corresponds to the information processing rate.

The rate control of the information transmitting device according to the present embodiment is not any different to the description in the Embodiment 2, and therefore is not described here again. The rate is controlled in such manner as shown in FIGS. 5A, 5B, 6A and 6B. To read the transmission rate of the transmission rate instead of the recording rate of the recording medium in the Embodiment 2 results in the transmission rate control according to the present embodiment.

Further, the rate controller 5B may increase the average rate in adjusting the average rate, in which case the rate controller 5B sets the average rate so that the average rate does not exceed the initial value of the average rate. It is preferable to control the average rate to be set so as to constantly stay below the initial value of the average rate, which further improves the control precision.

As described, when the coding average rate which is previously set exceeds the transmission rate of the transmission line, the average rate can be set to fall below the transmission rate. Accordingly, the rate control can be properly carried out in such manner that the coding amount to be allocated to the information of a higher complexity can be increased and the coding amount to be allocated to the information signal of a low complexity can be reduced.

In some of the information recording devices and information transmitting devices recited in the foregoing embodiments, a plurality of recording modes and transmission modes optionally selectable is set. In the respective modes, the recording rate and the transmission rate are alternatively set. In the devices of the foregoing type, the recording rate and the transmission rate can be changed as a result of selecting the respective modes. When the present invention is implemented to the device provided with the function of changing the rates, the same effect can be obtained changing the recording mode and the transmission mode without adjusting the average rate by the rate controller recited in the respective embodiments. When such a device is used, a display device for displaying the mode which is currently set in order to notify an operator of the currently set mode.

The information recording device and information transmitting device according to the present invention are capable of executing the variable-rate coding to the information signal. Therefore, the quality of the information signal can be generally equalized even in the case in which the coding average rate exceeds the recording rate of the recording medium. Such an effect is advantageous for the information recording device for coding the information signal such as image and audio and recording the information signal on the recording medium. Further, the same effect can be achieved in the case of transmitting the coded data via the transmission line instead of recording the data on the recording medium.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An information recording device comprising:
a coder for coding an inputted information signal;
a rate controller for controlling a coding rate of the coder in accordance with complexity of the information signal and controlling a coding amount per unit time in the coding process so that an average value of the coding amount can be approximate to an average rate which is previously set;
a temporary memory unit for temporarily memorizing the coded data; and
a recorder for recording the data memorized in the temporary memory unit on a recording medium, wherein
the recorder measures a recording rate in the recording process,
the rate controller adjusts the average rate to be below the recording rate measured by the recorder such that the coding amount to be allocated to a high complexity region of the information signal increases, while the coding amount to be allocated to a less complexity region of the information signal is reduced,
when the recorder detects that the recording medium as a current recording object is exchanged, the recorder informs the rate controller of the exchange, and
the rate controller resets the average rate to an initial value which is previously set when the rate controller receives the notice of the exchange of the recording medium.

2. An information recording device comprising:
a coder for coding an inputted information signal;
a rate controller for controlling a coding rate of the coder in accordance with complexity of the information signal and controlling a coding amount per unit time in the coding process so that an average value of the coding amount can be approximate to an average rate which is previously set;
a temporary memory unit for temporarily memorizing the coded data;
a recorder for recording the data memorized in the temporary memory unit on a recording medium; and
a reproducer for reading information written in the recording medium, wherein
the recorder measures a recording rate in the recording process,
the rate controller adjusts the average rate to be below the recording rate measured by the recorder such that the coding amount to be allocated to a high complexity region of the information signal increases, while the coding amount to be allocated to a less complexity region of the information signal is reduced,
the recorder writes the average rate set by the rate controller in the recording medium,
the reproducer reads the average rate from the recording medium when the recording medium is set in the information recording device,
the rate controller sets the average rate read by the reproducer as an initial value of the average rate of the recording medium in which the relevant average rate is written, and
the average rate set in the recording medium in a previous recording process is thereby used as the initial value of the average rate when the recording medium is subjected to a rerecording process.

3. An information recording device comprising:
a coder for coding an inputted information signal;
a rate controller for controlling a coding rate of the coder in accordance with complexity of the information signal and controlling a coding amount per unit time in the coding process so that an average value of the coding amount can be approximate to an average rate which is previously set;
a temporary memory unit for temporarily memorizing the coded data; and
a recorder for recording the data memorized in the temporary memory unit on a recording medium, wherein
the recorder measures a recording rate in the recording process,
the rate controller adjusts the average rate to be below the recording rate measured by the recorder such that the coding amount to be allocated to a high complexity region of the information signal increases, while the coding amount to be allocated to a less complexity region of the information signal is reduced,
the information recording device, further comprising:
a reproducer for reading individual identification information of the recording medium written in the recording medium; and
a memory unit for associating the recording rate of the recording medium measured by the recorder with the individual identification information of the recording medium read by the reproducer and memorizing the associated recording rate, wherein the rate controller reads the recording rate associated with the individual identification information read by the reproducer from the recorder and sets the recording rate as an initial value of the recording rate of the recording medium, and the recording rate set in the recording medium in a previous recording process is thereby used as the initial value of the recording rate when the recording medium is subjected to a rerecording process.

4. An information recording device, comprising:

a coder for coding an inputted information signal;

a rate controller for controlling a coding rate of the coder in accordance with complexity of the information signal and controlling a coding amount per unit time in the coding process so that an average value of the coding amount can be approximate to an average rate which is previously set;

a temporary memory unit for temporarily memorizing the coded data;

a recorder for recording the data memorized in the temporary memory unit on a recording medium;

a reproducer for reading individual identification information of the recording medium written in the recording medium; and a memory unit for associating the average rate of the recording medium set by the rate controller with the individual identification information of the recording medium read by the reproducer and memorizing the associated average rate, wherein the recorder measures a recording rate in the recording process, the rate controller adjusts the average rate to be below the recording rate measured by the recorder such that the coding amount to be allocated to a high complexity region of the information signal increases, while the coding amount to be allocated to a less complexity region of the information signal is reduced, the rate controller reads the average rate associated with the individual identification information read by the reproducer from the recorder and sets the average rate as an initial value of the average rate of the recording medium, and the average rate set in the recording medium in a previous recording process is thereby used as the initial value of the average rate when the recording medium is subjected to a rerecording process.

5. An information recording device comprising:

a coder for coding an inputted information signal;

a rate controller for controlling a coding rate of the coder in accordance with complexity of the information signal and controlling a coding amount per unit time in the coding process so that an average value of the coding amount can be approximate to an average rate which is previously set;

a temporary memory unit for temporarily memorizing the coded data; and a recorder for recording the data memorized in the temporary memory unit on a recording medium, wherein the rate controller compares a threshold value of a used amount of the temporary memory unit which is previously set and an actually used amount of the temporary memory unit and reduces the average rate when the used amount exceeds the threshold value, when the recorder detects that the recording medium as a current recording object is exchanged, the recorder notifies the rate controller of the exchange, and the rate controller resets the average rate to an initial value which is previously set when the rate controller receives the notice of the exchange of the recording medium.

6. An information recording device comprising:

a coder for coding an inputted information signal;

a rate controller for controlling a coding rate of the coder in accordance with complexity of the information signal and controlling a coding amount per unit time in the coding process so that an average value of the coding amount can be approximate to an average rate which is previously set;

a temporary memory unit for temporarily memorizing the coded data;

a recorder for recording the data memorized in the temporary memory unit on a recording medium; and a reproducer for reading information written in the recording medium, wherein the rate controller compares a threshold value of a used amount of the temporary memory unit which is previously set and an actually used amount of the temporary memory unit and reduces the average rate when the used amount exceeds the threshold value, the recorder writes the average rate set by the rate controller in the recording medium, the reproducer reads the average rate from the recording medium when the recording medium is set in the information recording device, the rate controller sets the average rate read by the reproducer as an initial value of the average rate of the recording medium in which the relevant average rate is written, and the average rate set in the recording medium in a previous recording process is thereby used as the initial value of the average rate when the recording medium is subjected to a rerecording process.

7. An information recording device comprising:

a coder for coding an inputted information signal;

a rate controller for controlling a coding rate of the coder in accordance with complexity of the information signal and controlling a coding amount per unit time in the coding process so that an average value of the coding amount can be approximate to an average rate which is previously set;

a temporary memory unit for temporarily memorizing the coded data;

a recorder for recording the data memorized in the temporary memory unit on a recording medium;

a reproducer for reading individual identification information of the recording medium written in the recording medium; and a memory unit for associating the average rate of the recording medium set by the rate controller with the individual identification information of the recording medium read by the reproducer and memorizing the associated average rate, wherein the rate controller compares a threshold value of a used amount of the temporary memory unit which is previously set and an actually used amount of the temporary memory unit and reduces the average rate when the used amount exceeds the threshold value, the rate controller reads the average rate associated with the individual identification information read by the reproducer from the recorder and sets the average rate as an initial value of the average rate of the recording medium, and the average rate set in the recording medium in a previous recording process is thereby used as the initial value of the average rate when the recording medium is subjected to a rerecording process.

8. An information transmitting device comprising:
a coder for coding an inputted information signal;
a rate controller for controlling a coding rate of the coder in accordance with complexity of the information signal and controlling a coding amount per unit time in the coding process so that an average value of the coding amount can be approximate to an average rate which is previously set;
a temporary memory unit for temporarily memorizing the coded data; and
a transmitter for transmitting the data memorized in the temporary memory unit to a transmission line, wherein
the transmitter measures a transmission rate in the transmission, and
the rate controller adjusts the average rate so that the average rate is below the transmission rate measured by the transmitter.

9. An information transmitting device as claimed in claim 8, wherein the transmitter calculates the transmission rate from a response time between the transmitter and the transmission line.

10. An information transmitting device as claimed in claim 8, wherein the transmitter calculates the transmission rate from a data volume transmitted to the transmission line and a time length required for transmitting the data volume.

11. An information transmitting device as claimed in claim 8, wherein the transmitter uses a transmission rate set when the transmission line is established as the transmission rate of the transmission line.

12. An information transmitting device as claimed in claim 8, wherein the transmitter serially renews the transmission rate from a relevant response time each time when the coded data is transmitted to the transmission line.

13. An information transmitting device as claimed in claim 12, wherein the rate controller serially renews the coding average rate based on the transmission rate serially renewed in the transmitter.

14. An information transmitting device as claimed in claim 8, wherein the transmitter previously carries out a transmission test before the coded data is transmitted to the transmission line and calculates the transmission rate from a relevant response time.

15. An information transmitting device as claimed in claim 8, wherein the rate controller sets the average rate which is newly set at a value lower than an initial value of the average rate in adjusting the average rate.

* * * * *